United States Patent
Pitteri et al.

(10) Patent No.: US 6,573,334 B1
(45) Date of Patent: Jun. 3, 2003

(54) BOTTLE CLOSURES MADE OF POLYOLEFINS

(75) Inventors: Silvio Pitteri, Brussels (BE); Rainer Schweda, Pfungstadt (DE); Antonella Angelini, Ferrara (IT)

(73) Assignee: Montell Technology Company BV, Hoofddorp (NL)

( * ) Notice: Subject to any disclaimer, the term of this patent is extended or adjusted under 35 U.S.C. 154(b) by 0 days.

(21) Appl. No.: 09/623,039

(22) PCT Filed: Dec. 16, 1999

(86) PCT No.: PCT/EP99/10009

§ 371 (c)(1),
(2), (4) Date: Oct. 16, 2000

(87) PCT Pub. No.: WO00/39238

PCT Pub. Date: Jul. 6, 2000

(30) Foreign Application Priority Data

Dec. 24, 1998 (EP) .............................................. 98204397

(51) Int. Cl.$^7$ .............................................. C08L 23/04
(52) U.S. Cl. .................. 525/240; 525/191; 525/217; 525/232; 428/35.7; 428/500; 524/500; 524/502; 524/515
(58) Field of Search ................. 428/500, 35.7; 525/240, 191, 232, 217; 524/500, 502, 515, 529

(56) References Cited

U.S. PATENT DOCUMENTS

| | | | |
|---|---|---|---|
| 5,486,558 A | * | 1/1996 | Lee .............................. 524/241 |
| 5,849,418 A | * | 12/1998 | Hoenig et al. .............. 215/341 |
| 5,874,139 A | * | 2/1999 | Bosiers et al. .............. 428/218 |
| 5,929,128 A | * | 7/1999 | Whetten et al. .............. 521/85 |

FOREIGN PATENT DOCUMENTS

EP      0 743 340 A2      11/1996

OTHER PUBLICATIONS

European Search Report Cover Sheet, including International Search Report.

* cited by examiner

Primary Examiner—James J. Seidleck
Assistant Examiner—Travis B Ribar

(57) ABSTRACT

A bottle closure made from an olefin polymer composition (A) which includes: 1) 90–100% by weight of a crystalline propylene homopolymer or propylene/$C_2$–$C_{10}$ alpha-olefin random copolymer, those polymers containing at least 94% by weight of a fraction insoluble in xylene at room temperature; and 2) 0–10% by weight of an ethylene/$C_3$–$C_{10}$ alpha-olefin elastomeric copolymer, provided that when the amount of polymer (2) is 0% by weight, polymer (1) is one of the above random copolymers. Said composition (A) has a flexural elastic modulus value at 23° C. of at least 1620 MPa, a strength at yield at 23° C. of at least 33 MPa, and an IZOD impact resistance at 0° C. of at least 2.5 kJ/m$^2$.

10 Claims, No Drawings

BOTTLE CLOSURES MADE OF POLYOLEFINS

The present invention relates to bottle closures made of olefin polymer resins. In particular, it relates to screw caps for bottles.

The use of thermoplastic olefin polymer resins for the production of bottle closures is in itself known. In particular, the use of a propylene homopolymer and high density polyethylene is already known.

Bottle closures made of the said polymers are widely employed, for example, in beverage industries through out the world. However, their use is limited because of the fact that bottles with the said closures cannot be subjected to heat treatments at high temperatures, such as severe pasteurising cycles at 80–90° C. Pasteurisable polyolefin closures are disclosed in GB patent specification 1,387,556. According to the disclosure of the said GB patent specification, the bottle closures are capable of withstanding temperatures of up to 75° C.

The need of pasteurising beverages in bottles at higher temperatures is now felt. Examples of beverages that could be pasteurised are soft drinks, in particular cider, fruit juices and some carbonated drinks. It is now desirable to carry out the pasteurisation cycles approximately at a temperature higher than 75° C., generally from about 77 to 88° C. The pasteurisation time is normally from 10 to 50 minutes, more typically 10–30 minutes.

Because of the low mechanical properties, in particular in terms of heat and creep resistance, of the olefin polymers until now employed, the said closures do not withstand the high pressure of the content inside the bottle during the pasteurising cycle. Consequently, gas and liquid tend to escape during the pasteurisation cycle and closures may even blow-off from the bottles.

Surprisingly, it has now been found that bottle closures made of particular polypropylenes can be subjected to heat treatments at high temperatures, in particular pasteurisation cycles. Hence, the bottle closures of the present invention are capable of withstanding heat treatments, in particular pasteurisation, at said high temperature without shortcomings. In particular the problem of brittleness is overcome. Hence, it is now possible to pasteurise bottles with the propylene polymer closures of the present invention at temperatures higher than 75° C. and for a time relatively long (e.g. 10–75 minutes) without the problems encountered with the closures of polypropylene used until now.

In addition to the above, the bottle closures of the present invention do not undergo any deformation at high temperatures.

Moreover, the types of polymers selected for producing the bottle closures of the present invention are suited for use in contact with food and beverages.

Hence, an object of the present invention is a bottle closure comprising or substantially made of an olefin polymer composition (A) comprising:

1) 90–100% by weight, preferably 92–98, more preferably 94–98, of a crystalline propylene homopolymer or random copolymer thereof with a comonomer selected from ethylene and a $C_4$–$C_{10}$ α-olefin; said polymers containing at least 94% by weight, preferably at least 96% of a fraction insoluble in xylene at room temperature (Polymer (1)); and 2) 0–10% by weight, preferably 2–8%, more preferably 2–6%, of an elastomeric copolymer of ethylene with propylene or a $C_4$–$C_{10}$ α-olefin or mixtures thereof and, optionally, from 0.5 to 10% by weight of a diene, the said elastomeric copolymer containing from 40% to 85% in moles of ethylene (Polymer (2));

provided that when the amount of Polymer (2) is 0% by weight, Polymer (1) is selected from the above said random copolymers.

Polymer composition (A) typically has a flexural elastic modulus (FM) value at 23° C. at least of 1620 MPa, preferably from 1650 to 2500 MPa; a value of the strength at yield at 23° C. at least of 33 MPa, preferably up to 45 MPa; and an IZOD impact resistance value at 0° C. at least of 2.5 kJ/m$^2$, preferably up to 20 kJ/m$^2$.

The said polymer composition (A) has approximately a VICAT value of at least 150° C., preferably 155° C., up to 160° C.

The methods for measuring the above properties and xylene-insoluble fraction are described hereinbelow.

Preferably Polymer (1) is a propylene homopolymer. When copolymers are used as Polymer (1), preferred are copolymers of propylene with a comonomer selected from ethylene, 1-butene, 1-pentene, 1-hexene, 4-methyl-1-pentene and 1-octene. Ethylene and butene-1 are the most preferred comonomers. The comonomer content normally ranges from 0.5 to 6% by weight, preferably 2 to 5%.

The MFRL value of polymer composition (A) is typically from 0.3 to 100 g/10 min, preferably 0.7–30 g/10 min, more preferably 1–15 g/10 min.

A suitable example of the above Polymer (1) is a crystalline propylene polymer with a broad molecular weight distribution (hereinafter referred to as Polymer (I)) in terms of the $\overline{M}_w/\overline{M}_n$ ratio. The propylene homopolymer is preferred.

Typically Polymer (I) has $\overline{M}_w/\overline{M}_n$ values from 5 to 60, preferably from 5 to 30. The intrinsic viscosity [η] values of Polymer (I) determined in tetrahydronaphthalene at 135° C. may vary from 1.2 to 7 dl/g, for example.

Suitable examples of Polymer (I) are those containing 10–65% by weight of a high molecular weight fraction (fraction (i)) and 35–60% by weight of a low molecular weight fraction (fraction (ii)) as described in European patent application 573862.

Polymer (2) is preferably selected from ethylene/propylene copolymers, ethylene/butene-1 copolymers, ethylene/propylene/$C_4$–$C_{10}$ α-olefin copolymers containing from 5 to 15% in moles of the α-olefin.

Preferably Polymer (2) comprises from 0 to 40% by weight of a fraction insoluble in xylene at room temperature.

Polymer (2) may be added in the pure state or as a mixture with crystalline polyolefins. The said mixture can replace Polymer (2) totally or partially. Suitable examples of said mixtures are thermoplastic elastomeric olefin polymer compositions. Accordingly, an object of the present invention is also a bottle closure comprising a blend of said Polymer (I) and a thermoplastic elastomeric olefin polymer composition comprising the following components (percentage by weight):

a) 70–97%, preferably 78–97%, of a propylene homopolymer containing more than 90%, preferably more than 94%, of a fraction insoluble in xylene at room temperature, or a crystalline propylene copolymer with ethylene or a $C_4$–$C_{10}$ α-olefin or a mixture thereof, containing over 85% by weight of propylene; the copolymer containing at least 85% by weight of a fraction insoluble in xylene at room temperature;

b) 0–10%, preferably 1–10%, of a crystalline copolymer containing ethylene, insoluble in xylene at room temperature; and c) 3–20%, preferably 3–12%, of an amorphous copolymer of ethylene with propylene and/or a $C_4$–$C_{10}$ 1-olefin and, optionally, from 1 to 10% of a diene, soluble in xylene at room temperature, and containing from 20 to 75% of ethylene.

In this case the previously said Polymer (2) is constituted by the sum of components (b) and (c).

Preferably said blend comprises 30–80% by weight of Polymer (I) and 20–70% by weight of the thermoplastic elastomeric olefin polymer composition with respect to the blend, more preferably 40–60% by weight of polymer (I) and 60–40% by weight of the thermoplastic elastomeric olefin polymer composition.

In the preferred both Polymer (I) and component (a) of the thermoplastic elastomeric olefin polymer composition are propylene homopolymers and the total ethylene content is 4% by weight or less.

In the present application the room temperature means a temperature of about 25° C.

Typically the thermoplastic elastomeric olefin polymer composition used in the present invention has a flexural elastic modulus value at 23° C. from 1300 to 1600 MPa.

Examples of dienes useful in the preparation of component (c) are 1,4-hexadiene, 1,5-hexadiene, dicyclopentadiene, ethylidene norbornene, 1,6-octadiene and vinyl norbornene. Ethylidene norbornene is preferred.

Examples of $C_4$–$C_{10}$ α-olefins useful in the preparation of the various components of the thermoplastic elastomeric olefin polymer compositions are the same as above-mentioned.

Component (c) is preferably an amorphous ethylene/propylene copolymer, ethylene/propylene/diene copolymer or ethylene/propylene/butene-1 copolymer.

When component (c) is a terpolymer, the α-olefin employed as a termonomer is preferably present in an amount from about 3 to about 10% by weight.

Polymer composition (A) may be obtained by preparin separately Polymer (1) and Polymer (2) and then blending them in the molten state or may be prepared directly in synthesis by adding an additional polymerization stage after the polymerization stage for producing Polymer (1).

Polymer (I) and the said thermoplastic elastomeric olefin polymer composition may be prepared by blending the separate polymers or, preferably, directly in polymerization by sequential polymerization process in a series of two or more reactors and in the presence of particular Ziegler-Natta catalysts.

Generally, Polymer (1) is formed in the first polymerisation stage, while in the following stages the relevant monomers are polymerised to form Polymer (2) or the thermoplastic elastomeric olefin polymer composition.

In the case of Polymer (I) the said fraction (i) is prepared before fraction (ii).

The polymerisation process may be carried out in an inert atmosphere in continuous or in batch, according to known techniques and operating in liquid phase, in the presence or absence of inert diluent, or in gas phase or in mixed liquid-gas phases. It is preferable to operate in gas phase.

The preferred method for preparing the said thermoplastic elastomeric olefin polymer composition is a two stage polymerisation process comprising the preparation of component (a) in a liquid monomer and, subsequently, the preparation of components (b) and (c) in gas phase.

Hydrogen as well as other known molecular regulators can be added as needed as a chain transfer agent for control of the molecular weight. By properly dosing the concentration of the molecular weight regulator in the various stages, it is possible to obtain the intrinsic viscosity and MFRL values previously described.

Reaction times and temperatures are not critical; however, the temperatures preferably range from 20 to 100° C.

For instance, the typical reaction temperature used in the preparation of component (a) and in the preparation of components (b) and (c) may be the same or different. Generally the reaction temperature employed for the preparation of component (a) is from about 40 to about 90° C., preferably from about 50 to about 80° C. Components (b) and (c) are typically prepared at a temperature from about 50 to about 80° C., preferably about 65 to 80° C.

The reactions can be conducted at a pressure from about atmospheric to about 7 MPa, preferably from about 1 MPa to 4 MPa in liquid phase polymerization and from 0.1 to 3 MPa, preferably from 0.5 to 3 MPa, in gas phase polymerization. Typical residence times are from about 30 minutes to about 8 hours.

Suitable inert hydrocarbon diluents include saturated hydrocarbons such as propane, butane, hexane and heptane.

The catalysts used for preparing the above polymers can be precontacted with small amounts of olefin (prepolymerization). Prepolymerization improves both catalyst activity and morphology of polymers.

The prepolymerization is carried out maintaining the catalyst in suspension in a hydrocarbon solvent (hexane or heptane, for example) and operating between room temperature and 60° C. for a period of time which is sufficient to produce a quantity of polymer ranging from 0.5 to 3 times the weight of the solid component. It can also be carried out in liquid propylene under the above indicated temperature conditions and producing quantities of polymer that can reach 1000 g per gram of catalyst component.

The catalyst used for preparing Polymer (I) is preferably characterized in that it is capable of producing propylene polymers having a xylene insoluble fraction at 25° C. greater than or equal to 90% by weight, preferably greater than or equal to 94%. Moreover, it has a sensitivity to molecular weight regulators high enough to produce propylene homopolymers having a high molecular weight fraction and low molecular weight fraction.

Methods of preparing the broad molecular weight distribution propylene Polymer (I) are described in above-mentioned European patent application 573 862, for example.

The catalysts used in the process for preparing Polymer (1) and said thermoplastic elastomeric olefin polymer composition are obtained by contacting:

(a) a solid catalyst component comprising a titanium compound having at least one titanium-halogen bond, and an electron-donor compound, both supported on a magnesium halide in active form;

(b) an Al-alkyl compound; and, optionally, (c) an external electron-donor compound.

Solid catalyst components (a) having the above-mentioned characteristics as well as the catalysts are well known in patent literature. Particularly advantageous are the catalysts described in U.S. Pat. No. 4,399,054 and European patents 45977 and 395083.

In general, the solid catalyst components used in said catalyst comprise, as electron-donor compounds, compounds selected from the ethers, ketones, lactones, compounds containing N, P and/or S atoms and esters of mono- and dicarboxylic acids. Particularly suitable electron-donor compounds are phthalic acid esters, such as diisobutyl, dioctyl, diphenyl and benzylbutyl phthalate.

Other electron-donors particularly suitable are 1,3-diethers of formula:

wherein $R^I$ and $R^{II}$ are the same or different and are $C_1$–$C_{18}$ alkyl, $C_3$–$C_{18}$ cycloalkyl or $C_7$–$C_{18}$ aryl radicals; $R^{III}$ and $R^{IV}$ are the same or different and are $C_1$–$C_4$ alkyl radicals; or are the 1,3-diethers in which the carbon atom in position 2 belongs to a cyclic or polycyclic structure made up of 5, 6 or 7 carbon atoms and containing two or three unsaturations.

Ethers of this type are described in published European patent applications 361493 and 728769.

Representative examples of said dieters are 2-methyl-2-isopropyl-1,3-dimethoxypropane, 2,2-diisobutyl-1,3-dimethoxypropane, 2-isopropyl-2-cyclopentyl-1,3-dimethoxypropane, 2-isopropyl-2-isoamyl-1,3-dimethoxypropane and 9,9-bis (methoxymethyl) fluorene.

The above mentioned polymers and polymer compositions may be blended with the usual additives for polymers, such as stabilisers, pigments and so on, nucleating agents, such as p-tert-butyl benzoate, 1,3- and 2,4-dibenzylidensorbitol, sodium benzoate, talc, and usual additives for bottle closures, such as antistatic and slip additives.

Any suitable apparatus available in the art, for instance extruders, may be used for preparing the blends.

As already mentioned typically the MFRL values of the polymer composition (A) vary from 0.3 to 100 g/10 min. The said MFR values can be obtained directly in the polymerisation process or successively by chemical degradation (visbreaking) of the polymers or polymer compositions as prepared in the polymerisation process. The visbreaking can be obtained by means of free radical initiators such as organic peroxides. Examples of organic peroxides are (2,5-dimethyl-2,5-ditert-butylperoxy)hexane and dcumyl peroxide. The visbreaking is carried out by using suitable amounts of free radical initiators and under an inert atmosphere such as nitrogen. The said process can be carried out according to the known techniques, methods and operative conditions.

The bottle closures of the present invention may be prepared by a compression moulding process from the above α-olefin polymer composition having preferably an MFRL value from 0.8 to 6g/10 min. However, an injection moulding process may also be used when compositions with MFRL values of at least 2 g/10 min, preferably from 3 to 20, are used. The said moulding processes are carried out according to the known techniques.

The bottle closures according the present invention can have the standard size and weight of closures normally employed in the art for pasteurisation. In particular they can have the standard size and weight of closures, such as screw caps for bottles, not intended for pasteurisation. Generally bottle caps have an inner diameter ranging from 12 to 48 mm and weight from 0.5 to 10 grams. Typically, soft drinks caps have an inner diameter of about 28 mm, a height of about 20 mm, a wall thickness ranging from 0.8 to 1.8 mm and weight from 2.5 to 4 grams.

The bottle closures of the present invention may also include a tamper evident band. Moreover, the bottle closures of the present invention may comprise a sealing plug, insuring gas and liquid tightness or a separate rubbery sealing liner.

Generally speaking, the bottle closures of the present invention may be used whenever bottles have to be subjected to high temperatures, thanks to their good mechanical properties at high temperatures. For example, the bottle closures of the present invention are particularly suitable for being subjected to pasteurisation cycles as said above as well as for closing bottles to be stocked at high temperatures for a long time.

The following analytical methods are used to characterise the polymers and the compositions obtained therefrom.

Melt Flow Rate (MFRL): ASTM-D 1238, condition L

[η] intrinsic viscosity: determined in tetrahydronaphtalene at 135° C.

Ethylene content: I.R. Spectroscopy

Fractions soluble and insoluble in xylene at 25° C.: 2.5 g of polymer are dissolved in 250 ml of xylene at 135° C. under agitation. After 20 minutes the solution is allowed to cool to 25° C., still under agitation, and then allowed to settle for 30 minutes. The precipitate is filtered with filter paper, the solution evaporated in nitrogen flow, and the residue dried under vacuum at 80° C. until constant weight is reached. Thus one calculates the percent by weight of polymer soluble and insoluble in xylene at ambient temperature.

$\overline{M}_w/\overline{M}_n$: measured by way of Gel Permeation Chromatography Polidispersity Index (PI): measurement of molecular weight distribution in the polymer. To determine the PI value, the modulus separation at low modulus value, e.g. 500 Pa, is determined at a temperature of 200° C. by using a RMS-800 parallel plates rheometer model marketed by Rheometrics (USA), operating at an oscillation frequency which increases from 0.01 rad/second to 100 rad/second. From the modulus separation value, the PI can be derived using the following equation:

$$PI = 54.6 \times (\text{modulus separation})^{-1.76}$$

wherein the modulus separation (MS) is defined as:

$$MS = (\text{frequency at } G' = 500 \text{ Pa})/(\text{frequency at } G'' = 500 \text{ Pa})$$

wherein G' is the storage modulus and G" is the low modulus.

Flexural Elastic Modulus (FM): ISO 178
Elongation at yield: ISO/R 527
Strength at break and strength at yield: ISO 527
Notched IZOD impact test: ISO 180/1A
Heat Distortion Temperature (HDT): ISO 75
VICAT: ISO 306.

The following examples are given to illustrate but not limit the present invention.

Polymer Compositions Used in the Examples

Composition (A) is a propylene polymer composition having an MFRL value of 1.9 g/10 min and is obtained by chemical degradation of a precursor composition by means of suitable amounts of organic peroxides. The composition subjected to visbreaking has an MFRL value of 1.2 g/10 min, a xylene-soluble fraction of 6.5% by weight, an intrinsic viscosity [η] value of the xylene-soluble fraction (without oils) of 3 dl/g and shows the following composition:

95.2% by weight of a propylene hompolymer having a content of fraction soluble in xylene of 2.5% by weight, a PI value of 4.7 and $\overline{M}_w/\overline{M}_n$ value of 7.6; and 4.8% by weight of an ethylene/propylene copolymer having an ethylene content of 48% by weight. The xylene-soluble fraction of the copolymer is of 86% by weight and contains 28.2% by weight of ethylene.

The precursor composition is produced in continuous in a series of three connected reactors, wherein the propylene homopolymer is product in the first two reactors and the ethylene/propylene copolymer is produced in the third. The polymerization is carried out in the presence of a catalyst obtained by contacting a solid catalyst component comprising $TiCl_4$ and diisobutylphtahalate, both supported on $MgCl_2$ in active form, triethylaluminum and dicyclopentyldimethoxisilane as an electron-donor compound.

Polymer (B) is a propylene homopolymer having an MFRL value of 3.5 g/10 min, a xylene-soluble fraction of 1.8% by weight, PI value of 6 and $\overline{M}_w/\overline{M}_n$ value of 9.3; the homopolymer was nucleated with 1800 ppm of 3,4-dimethylbenzylidil sorbitol. It is produced in the same way as composition (A), except that the third polymerisation step is not carried out. The results of the polymerisation runs for producing composition (A) and polymer (B) are shown in table 1.

TABLE 1

| Composition or Polymer | A | B |
|---|---|---|
| First Reactor | | |
| Polymer produced (% wt) | 47.6 | 52 |
| MFRL (g/10 min) | 0.3 | 0.3–0.4 |
| Second Reactor | | |
| Polymer produced (% wt) | 47.6 | 48 |
| MFRL (g/10 min) | 1.4 | — |
| Third Reactor | | |
| Polymer produced (% wt) | 4.8 | 0 |

Composition (C) is a propylene polymer composition having an MFRL value of 4.6 g/10 min and is obtained by chemical degradation of a precursor composition by means of suitable amounts of organic peroxides. The composition subjected to degradation has an MFRL value of 3.0 g/10 min, a xylene-soluble fraction (without oils) of 8.4% by weight, an intrinsic viscosity [η] value of the xylene-soluble fraction (without oils) of 2.3 dl/g and shows the following composition:

93% by weight of a propylene homopolymer having an MFRL value of 3.1 g/10 min; the xylene-soluble fraction is about 2.5% by weight, PI value of 4.2 and $\overline{M}_w/\overline{M}_n$ value of 6.9; and 7% by weight of an ethylene/propylene amorphous copolymer containing 48% of ethylene. The xylene-soluble fraction of the copolymer is 86% and contains 32% by weight of ethylene.

Composition (D) is a thermoplastic elastomeric olefin polymer composition with an MFRL value of 6.0 g/10 min and is obtained by chemical degradation of a precursor composition by means suitable amounts of organic peroxides. The composition subjected to visbreaking has a MFRL value of 4.0 g/10 min, an intrinsic viscosity [η] value of the xylene-soluble fraction (without oils) of 2.3 dl/g and has the following composition:

91.5% of a crystalline propylene homopolymer containing about 2.5% of fraction soluble in xylene; and 8.5% of an ethylene/propylene copolymer containing 60% by weight of ethylene. The xylene-soluble fraction of the copolymer is 72% by weight and contains 40% by weight of ethylene.

Compositions (C) and (D) are obtained by sequential polymerization in the presence of a high yield and highly stereospecific Ziegler-Natta catalyst supported on $MgCl_2$.

EXAMPLE 1

Pellets of polymer (A) containing 5500 ppm of erucamide, 3000 ppm of glycerol monostearate and 1100 ppm of sodium benzoate are prepared by extrusion in a Werner ZSK 280 (L/D is 16 and the diameter is of 280 mm) operating at a temperature ranging from 235–240° C.

Specimens are prepared by injection moulding with pellets of the polymer obtained by extrusion. The specimens are prepared in accordance with method ISO 1873-2.

EXAMPLE 2

Example 1 is repeated. The only difference is that composition (C) is used instead of composition (A).

EXAMPLE 3

Example 1 is repeated, except that a blend of polymer (B) and composition (D) is used instead of composition (A). The polymer (B)/composition (D) ratio is 1/1.

Comparative Example 1c

Example 1 is repeated, except that composition (D) is used instead of composition (A).

Table 2 shows the mechanical properties determined using the test specimens prepared in Examples 1–3 and Comparative Example 1c.

EXAMPLE 4

The pellets as extruded in Example 3 are transformed into standard screw caps by injection moulding. The said screw caps are for soft drinks, have an inner diameter of about 3 g and are equipped with a rubbery sealing liner and a tamper-evident band.

The processing conditions for a 32 cavities injection moulder are:
Barrel temperatures: 210–230° C.;
Hot runner temperatures: 221–260° C.;
Mould water temperature: 15° C.;
Injection time: 0.33 second;
After pressure time: 0.90 second;
Feeding time: 3.14 seconds.
The used injection-moulder is a Netstall Synergy 240 produced by Netstal.

Then bottles with the thus obtained screw caps are filled up with lemonade having a $CO_2$ content of 5.0 g/l. The bottles are then subjected to a pasteurising cycle carried out at 77° C. and for a time of 50 minutes. Standard torque force for the closure is 1.15 kg·cm.

It is noted that the screw caps do not blow-off from the bottles and liquid does not escape from the bottles during or after the pasteurising cycle. The gas content in the bottles is of 4.13 g/l after the pasteurising cycle (3.5 g/l being the required minimum $CO_2$ content).

EXAMPLE 5

Example 4 is repeated excepted that a bend of 25% by weight of polymer (B) and 75% by weight of composition (D) is used.

It is noted that the screw caps do not blow-off from the bottles and liquid does not escape from the bottles during or after the pasteurising cycle. The gas content in the bottles is of 4.06 g/l after the pasteurising cycle.

Comparative Example 2c

Example 5 is repeated except that composition (D) is used instead of the blend.

It is noted that a number of screw caps blows-off from the bottles and a number of screw caps are slightly unscrewed so that a certain amount of gas and, sometimes, liquid have escaped from the bottles during or after the pasteurising cycle.

TABLE 2

| Example | 1 | 2 | 3 | 1c |
|---|---|---|---|---|
| FM at 23° C. (MPa) | 1800 | 1730 | 1675 | 1470 |
| FM at 80° C. (MPa) | 600 | 500 | 565 | 485 |
| Strength at yield at 23° C. (MPa) | 35.5 | 33.9 | 34.1 | 30.2 |
| Strength at yield at 80° C. (MPa) | 16.7 | 14.6 | 16.1 | 13.5 |
| Elongation at yield at 23° C. (%) | 7.2 | 7.3 | 8.2 | 8.1 |
| Elongation at yield at 80° C. (%) | 19.5 | 19.4 | 20.2 | 20.6 |
| Elongation at break at 23° C. (%) | 70 | 160 | 305 | 270 |
| Elongation at break at 80° C. (%) | >180 | >180 | >180 | >180 |
| Notched Izod at 23° C (kJ/m$^2$) | 46 | 8.4 | 7.6 | 7.7 |
| Notched Izod at 0° C (kJ/m$^2$) | 5.4 | 4.3 | 3.1 | 5.0 |
| Notched Izod at −20° C. (kJ/m$^2$) | 3.7 | 3.6 | 2.6 | 3.7 |
| VICAT 1 kg (° C.) | 157 | 155 | 156.5 | 152 |

What is claimed is:

1. A bottle closure comprising an olefin polymer composition (A) which comprises:
   1) 90–100% by weight of a crystalline propylene homopolymer or random copolymer thereof with 0.5–6% by weight of a comonomer selected from ethylene and a $C_4$–$C_{10}$ α-olefin; said polymers containing at least 94% by weight of a fraction insoluble in xylene at room temperature (Polymer (1)); and
   2) 0–10% by weight of an elastomeric copolymer of ethylene with propylene or a $C_4$–$C_{10}$ α-olefin or mixtures thereof and, optionally, from 0.5 to 10% by weight of a diene, the said elastomeric copolymer containing from 40 to 85 mole % of ethylene (Polymer (2));

provided that when the amount of Polymer (2) is 0% by weight, Polymer (1) is selected from the above said random copolymers; said composition (A) having a flexural elastic modulus value at 23° C. at least of 1620 MPa; a value of the strength at yield at 23° C. at least of 33 MPa; and an IZOD impact resistance value at 0° C. at least of 2.5 kJ/m$^2$.

2. The bottle closure of claim 1, wherein the olefin polymer composition (A) has a melt flow ratio value (according to ASTM D 1238, condition L) in the range from 0.3 to 100 g/10 minutes.

3. The bottle closure of claim 2, wherein the olefin polymer composition (A) has been subjected to chemical degradation.

4. The bottle closure of claims according to claim 1, wherein Polymer (1) is a crystalline propylene homo- or copolymer having a $\overline{M}_w/\overline{M}_n$ ratio comprised in the range of from 5 to 60.

5. The bottle closure according to claim 1, wherein Polymer (1) is a propylene homopolymer.

6. The bottle closure of claim 1 wherein the olefin polymer composition (A) is a polymer blend comprising (percentage by weight):
   A) 30–80% of a crystalline propylene homo- or copolymer having a $\overline{M}_w/\overline{M}_n$ ratio comprised in the range of from 5 to 60; and
   B) 20–70% of a thermoplastic elastomeric olefin polymer composition comprising:
      a) 70–97% of a propylene homopolymer containing more than 90% of a fraction insoluble in xylene at room temperature, or a crystalline propylene copolymer with ethylene or a $C_4$–$C_{10}$ α-olefin or mixtures thereof, containing over 85% by weight of propylene; the copolymer containing at least 85% by weight of a fraction insoluble in xylene at room temperature.
      b) 0–10% of a crystalline copolymer containing ethylene, insoluble in xylene at room temperature; and
      c) 3–20% of an amorphous copolymer of ethylene with propylene and/or a $C_4$–$C_{10}$ 1-olefin and, optionally, from 1 to 10% of a diene, soluble in xylene at room temperature, and containing from 20 to 75% of ethylene;

provided that the total content of fractions b) and c) of B) is up to 10% by weight with respect to the polymer blend.

7. The bottle closure of claim 6, wherein Polymer (1) and component (a) are propylene homopolymers and the total ethylene content is 4% by weight with respect to the blend.

8. The bottle closure according to claim 6, wherein the thermoplastic elastomeric olefin polymer composition has a flexural elastic modulus value at 23° C. from 1300 to 1600 MPa.

9. The bottle closure according to claim 1, in form of a bottle screw cap.

10. Bottles closed with the bottle closure according to claim 1.

* * * * *

UNITED STATES PATENT AND TRADEMARK OFFICE
CERTIFICATE OF CORRECTION

PATENT NO. : 6,573,334 B1
DATED : June 3, 2003
INVENTOR(S) : Silvio Pitteri

It is certified that error appears in the above-identified patent and that said Letters Patent is hereby corrected as shown below:

<u>Title page,</u>
Item [73], Assignee, please change "Montell Technology Company BV" to
-- Basell Technology Company BV --.

<u>Column 10,</u>
Line 4, delete "of claims".

Signed and Sealed this

Eleventh Day of November, 2003

JAMES E. ROGAN
*Director of the United States Patent and Trademark Office*